US012472914B2

(12) United States Patent
Kim et al.

(10) Patent No.: US 12,472,914 B2
(45) Date of Patent: Nov. 18, 2025

(54) APPARATUS AND METHOD FOR CONTROLLING ELECTRONIC BRAKE OF VEHICLE

(71) Applicant: HYUNDAI MOBIS Co., Ltd., Seoul (KR)

(72) Inventors: Hyeong Sik Kim, Yongin-si (KR); Jin Woo Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 276 days.

(21) Appl. No.: 18/088,026

(22) Filed: Dec. 23, 2022

(65) Prior Publication Data

US 2023/0365109 A1    Nov. 16, 2023

(30) Foreign Application Priority Data

May 13, 2022 (KR) .................. 10-2022-0058941

(51) Int. Cl.
*B60T 8/1761* (2006.01)
*B60T 8/171* (2006.01)

(52) U.S. Cl.
CPC .......... *B60T 8/17616* (2013.01); *B60T 8/171* (2013.01)

(58) Field of Classification Search
CPC .... B60T 8/17616; B60T 8/171; B60T 8/1761; B60T 8/172; B60T 8/329; B60T 2270/89; B60Y 2400/3032; B60Y 2400/81
USPC ........................................................ 701/74
See application file for complete search history.

(56) References Cited

U.S. PATENT DOCUMENTS

| | | | |
|---|---|---|---|
| 2001/0025219 A1* | 9/2001 | Ohba ................. | B60K 23/0808 903/910 |
| 2007/0046099 A1* | 3/2007 | Matsuura ............ | B60T 8/17616 303/152 |
| 2015/0073678 A1* | 3/2015 | Shimizu .................... | B60T 8/72 701/79 |
| 2020/0317174 A1* | 10/2020 | Terasaka ............... | B60T 13/741 |
| 2021/0188234 A1* | 6/2021 | Iwama .................. | B60L 3/0076 |
| 2021/0284112 A1* | 9/2021 | Mizoo ................. | B60W 30/162 |
| 2022/0289157 A1* | 9/2022 | Leibbrand ............. | B60T 17/221 |

FOREIGN PATENT DOCUMENTS

KR    10-2021-0009790 A    1/2021

* cited by examiner

*Primary Examiner* — Fadey S. Jabr
*Assistant Examiner* — Paula L Schneider
(74) *Attorney, Agent, or Firm* — Morgan, Lewis & Bockius LLP

(57) ABSTRACT

An apparatus and method for controlling electronic brake of a vehicle is disclosed. The apparatus for controlling electronic brake of a vehicle according to an aspect of the present disclosure includes a sensor that detects a deceleration corresponding to a wheel speed of a front wheel and a rear wheel of the vehicle or driver's brake power, and a processor that slows down a parking brake application by determining a wheel slip rate based on the wheel speed of the front wheel and the wheel speed of the rear wheel, and by adjusting a first duty ratio of the parking brake application within the deceleration change section based on the determined wheel slip rate and the detected deceleration.

15 Claims, 2 Drawing Sheets

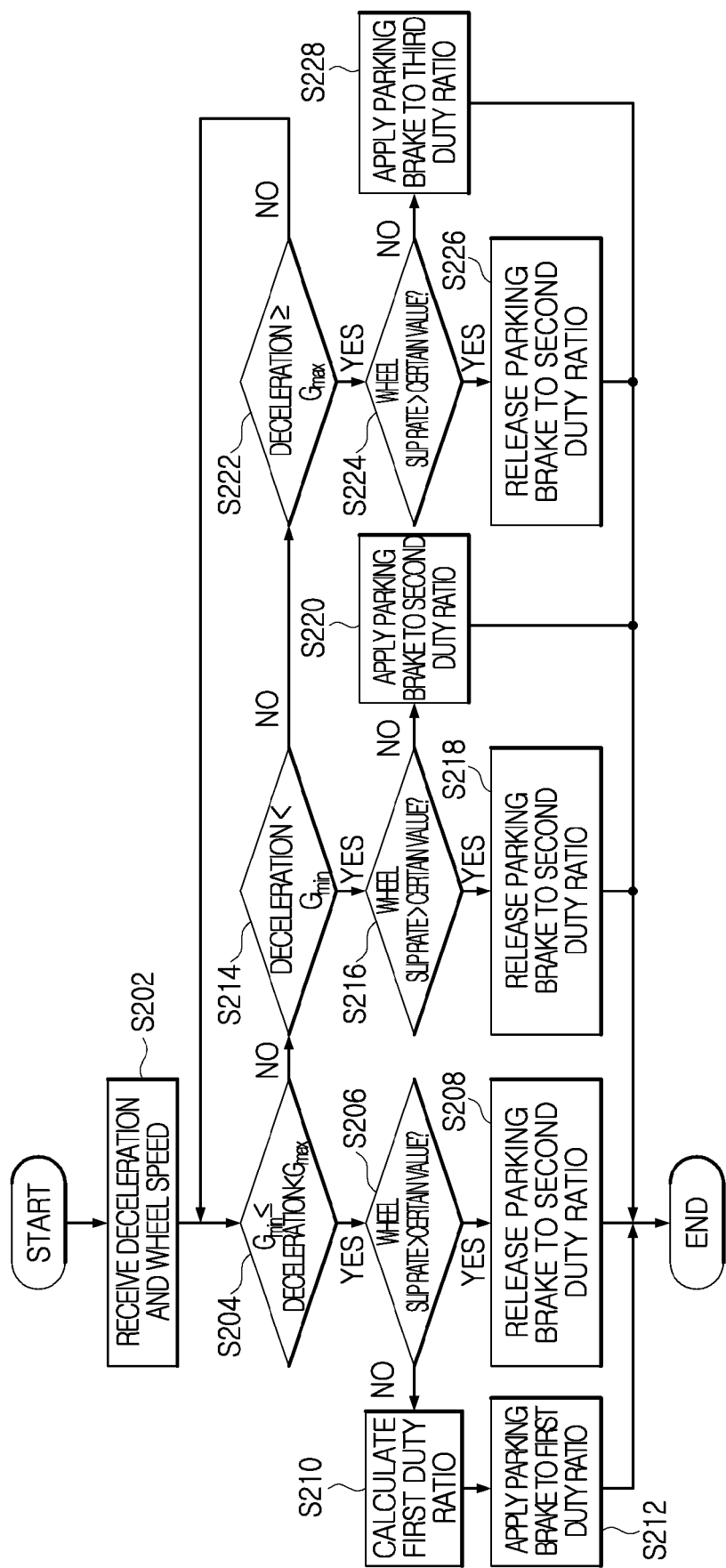

APPARATUS AND METHOD FOR CONTROLLING ELECTRONIC BRAKE OF VEHICLE

CROSS-REFERENCE TO RELATED APPLICATION

This application claims priority from and the benefit of Korean Patent Application No. 10-2022-0058941, filed on May 13, 2022, which is hereby incorporated by reference for all purposes as if set forth herein.

BACKGROUND

Field

Exemplary embodiments of the present disclosure relate to an apparatus and method for controlling electronic brake of a vehicle, and more particularly, to stably control a brake while preventing a wheel from being applied in an electric brake that parking is only possible without a torque sensor.

Discussion of the Background

An electronic brake (for example, electronic parking brake; hereinafter referred to as the EPB) electronically controls an operation of a parking brake. The EPB is a system that automatically applies and releases the parking brake through a simple switch operation, which automatically operates to maintain a vehicle in a parked or stopped state, in a case where the vehicle stops even though a driver does not manually apply the parking brake, or the vehicle is likely to be pushed back at the start of a ramp.

The EPB system provides a number of functions, such as an automatic engagement of the parking brake in case of emergency braking and engine shutdown, and a prevention of pushing on the ramp. The EPB system has a drive away release (DAR) function that automatically releases the parking brake when an accelerator pedal is pressed with the parking brake applied. When the vehicle equipped with the EPB is restarted after the parking brake is applied on a flat or downhill road, the DAR function provides a function for the EPB to automatically release the parking brake with only a movement of the accelerator pedal without a separate release button motion.

Among electronic brake systems, when emergency braking is performed in a brake system with a small friction material area, such as an electronic brake system (for example, spot moc, parking only epb), which does not have a torque sensor and parking is only possible, a large brake torque variation (BTV) occurs. If the BTV is large, a difference between deceleration and wheel slip increases, and if feedback control is performed using it, an amplitude will inevitably increase. Then, overall average deceleration decreases, thereby preventing a vehicle from stopping within a short distance in an emergency and causing the vehicle to spin due to a wheel lock.

Accordingly, there is a need for development to stably control the brake while preventing the wheel from being applied in the electric brake that can only be parked without the torque sensor.

The related art of the present disclosure is disclosed in Korean Patent Application No. 10-2021-0009790 (published on Jan. 27, 2021 and entitled "Apparatus and method for controlling electronic brake of vehicle").

SUMMARY

The present disclosure has been created to solve the above problems, and an object of the present disclosure is to provide an apparatus and method for controlling electronic brake of a vehicle which can stably control a brake while preventing a wheel from being applied in an electronic parking brake (EPB) which parking is only possible without a torque sensor.

An object achieved by the present disclosure is not limited to the above-mentioned object(s), and other object(s) not mentioned may be clearly understood by those skilled in the art from the following description.

In an embodiment, an apparatus for controlling electronic brake of a vehicle according to an aspect of the present disclosure includes a sensor that detects a deceleration corresponding to a wheel speed of a front wheel and a rear wheel of the vehicle or driver's brake power, and a processor that slows down a parking brake application by determining a wheel slip rate based on the wheel speed of the front wheel and the wheel speed of the rear wheel and by adjusting a first duty ratio of the parking brake application within a deceleration change section based on the wheel slip rate and a deceleration.

The sensor may include a wheel speed sensor which is configured to detect the wheel speed of the front wheel and the wheel speed of the rear wheel; and a deceleration sensor which is configured to measure the deceleration.

The processor may calculate the wheel slip rate based on a difference between the wheel speed of the front wheel and the wheel speed of the rear wheel.

In a case where the deceleration is equal to or greater than a lower limit of a deceleration change, less than an upper limit of the deceleration change, and the wheel slip rate does not exceed a predetermined value, the processor may adjust a maximum value of duty ratio when the deceleration change is a lower limit and may adjust the first duty ratio based on at least one of a minimum value of duty ratio, the lower limit of the deceleration change, the upper limit of the deceleration change, and the deceleration when the deceleration change is the upper limit.

The processor may release a parking brake to a second duty ratio faster than the first duty ratio, in a case where the deceleration is equal to or greater than the lower limit of the deceleration change, less than the upper limit of the deceleration change, and the wheel slip rate exceeds the predetermined value.

The processor may apply the parking brake to the second duty ratio, in a case where the deceleration is less than the lower limit of the deceleration change and the wheel slip rate does not exceed a predetermined value.

The processor may release the parking brake to the second duty ratio, in a case where the deceleration is less than the lower limit of the deceleration change and the wheel slip rate exceeds a predetermined value.

In a case where the deceleration is equal to or greater than the upper limit of the deceleration change and the wheel slip rate does not exceed a predetermined value, the processor may apply the parking brake with a third duty ratio corresponding to the minimum value of the duty ratio when the deceleration change is the upper limit.

The processor may release the parking brake to the second duty ratio, in a case where the deceleration is equal to or greater than the upper limit of the deceleration change and the wheel slip rate exceeds a predetermined value.

In another embodiment, a method for controlling electronic brake of a vehicle according to another aspect of the present disclosure includes receiving, by a processor, a deceleration corresponding to a wheel speed of a front wheel and a rear wheel of the vehicle or a brake pedal force, determining, by the processor, a wheel slip rate based on the wheel speed of the front wheel and the wheel speed of the rear wheel; and slowing down, by the processor, a parking brake application by adjusting a first duty ratio of the parking brake application within a deceleration change section based on the wheel slip rate and a deceleration.

In the determining the wheel slip rate, the processor may calculate the wheel slip rate based on a difference between the wheel speed of the front wheel and the wheel speed of the rear wheel.

In the slowing down the parking brake application, in a case where the deceleration is equal to or greater than a lower limit of a deceleration change, less than an upper limit of the deceleration change, and the wheel slip rate does not exceed a predetermined value, the processor may adjust a maximum value of duty ratio when the deceleration change is a lower limit and adjust the first duty ratio based on at least one of a minimum value of duty ratio, the lower limit of the deceleration change, the upper limit of the deceleration change, and the deceleration when the deceleration change is the upper limit.

In the slowing down the parking brake application, the processor may release the parking brake to a second duty ratio faster than the first duty ratio, in a case where the deceleration is equal to or greater than the lower limit of the deceleration change, less than the upper limit of the deceleration change, and the wheel slip rate exceeds the predetermined value.

In the slowing down the parking brake application, the processor may apply the parking brake to the second duty ratio, in a case where the deceleration is less than the lower limit of the deceleration change and the wheel slip rate does not exceed a predetermined value.

In the slowing down the parking brake application, the processor may release the parking brake to the second duty ratio, in a case where the deceleration is less than the lower limit of the deceleration change and the wheel slip rate exceeds a predetermined value.

In the slowing down the parking brake application, in a case where the deceleration is equal to or greater than the upper limit of the deceleration change and the wheel slip rate does not exceed a predetermined value, the processor may apply the parking brake with a third duty ratio corresponding to the minimum value of the duty ratio when the deceleration is the upper limit.

In the slowing down the parking brake application, the processor may release the parking brake to the second duty ratio, in a case where the deceleration is equal to or greater than the upper limit of the deceleration change and the wheel slip rate exceeds a predetermined value.

An apparatus and method for controlling electronic brake according to an aspect of the present disclosure may slow down a parking brake application by adjusting a duty ratio of a parking brake within a deceleration change section based on a wheel slip rate and deceleration, thereby stably capable of controlling a brake while preventing the wheel from being applied during emergency braking.

Meanwhile, effects of the present disclosure are not limited to the above-mentioned effects, and various effects may be included within the scope obvious to those skilled in the art from the contents to be described below.

BRIEF DESCRIPTION OF THE DRAWINGS

FIG. 2 is a flowchart illustrating an operation of the apparatus for controlling electronic brake of a vehicle according to an embodiment of the present disclosure.

DETAILED DESCRIPTION OF THE ILLUSTRATED

Embodiments

Figure 1:
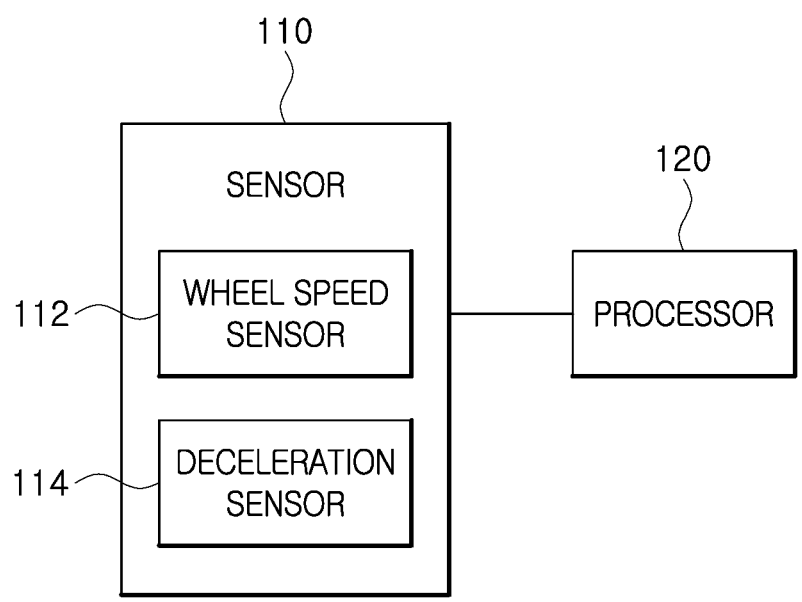
FIG. 1 is a block diagram schematically illustrating a configuration of an apparatus for controlling electronic brake of a vehicle according to an embodiment of the present disclosure.

Hereinafter, an apparatus and method for controlling electronic brake of a vehicle will be described below with reference to the accompanying drawings through various exemplary embodiments. For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of these terms should be defined in light of details disclosed throughout the present specification.

The implementation described above in the present specification may be performed by, for example, a method or a process, an apparatus, a software program, a data stream, or a signal. Although being discussed only in the context of single form implementation (for example, being discussed only as a method), the discussed features may be implemented even as another form (for example, an apparatus, or a program). The apparatus may be implemented as proper hardware, software, or firmware. The method may be implemented as, for example, an apparatus, such as a processor indicating a processing apparatus including a computer, a microprocessor, an integrated circuit, or a programmable logic apparatus. The processor also includes a communication apparatus, such as a computer, a cellular phone, a portable/personal digital assistant (PDA), and other devices which facilitate information communication between end users.

FIG. 1 is a block diagram schematically illustrating a configuration of an apparatus for controlling electronic brake of a vehicle according to an embodiment of the present disclosure.

Referring to FIG. 1, an apparatus for controlling electronic brake 100 according to an embodiment of the present disclosure includes a sensor 110 and a processor 120.

The sensor 110 may detect a deceleration corresponding to wheel speeds of front and rear wheel or brake pedal force. The sensor 110 may include a wheel speed sensor 112, a deceleration sensor 114, a pedal stroke sensor (not illustrated), and the like.

The wheel speed sensor 112 may be mounted at a position close to the front wheel and the rear wheel to detect wheel speed of the front wheel and the rear wheel and transmit the detected wheel speed to the processor 120. The wheel speed sensor 112 may include a first wheel speed sensor (not illustrated) that measures the speed of a front left wheel (not illustrated) of a vehicle, a second wheel speed sensor that measures a speed of a front right wheel (not illustrated) of the vehicle, a third wheel speed sensor that measures a speed of a rear left wheel (not illustrated) of the vehicle, and a fourth wheel that measures a speed of a rear right wheel (not illustrated) of the vehicle.

The deceleration sensor 114 may measure a deceleration of the vehicle and transmit the measured deceleration to the processor 120. The deceleration sensor 114 may implement as a G-sensor.

The pedal stroke sensor may output an electrical signal corresponding to a displacement of the brake pedal input by the user.

The processor 120 may calculate a wheel slip rate based on wheel speed of the front wheel and the rear wheel and adjust a duty ratio of a parking brake application within a deceleration change section based on the determined wheel slip rate and the detected deceleration, thereby slowing down the parking brake application. Herein, the duty ratio may be a ratio of a time when a pad presses a disk. The longer the duty ratio, the more pressurized it is, and the shorter the duty ratio, the less pressurized it is.

The processor 120 may calculate the wheel slip rate based on a difference between the wheel speed of the front wheel and the wheel speed of the rear wheel. That is, the processor 120 may calculate the wheel slip rate using Equation 1 below.

$$\text{wheel slip rate} = (\text{vehicle speed} - \text{wheel speed})/\text{vehicle speed} \times 100 \quad \text{[Equation 1]}$$

Herein, the vehicle speed may be the wheel speed of the front wheel, and the wheel speed may be the wheel speed of the rear wheel.

The processor 120 may adjust a first duty ratio of the parking brake application according to the wheel slip rate or release the parking brake at a higher (faster) second duty ratio (for example, 100%) than the first duty ratio, in a case where the deceleration is equal to or greater than a lower limit of the deceleration change (Gmin) and less than an upper limit of the deceleration change (Gmax) (that is, within the deceleration change range). Herein, the second duty ratio is a preset value and may be arbitrarily adjusted.

Specifically, in a case where the deceleration is equal to or greater than the lower limit of the deceleration change (Gmin), is less than the upper limit of the deceleration change (Gmax), and the wheel slip rate exceeds a predetermined value, the processor 120 may release the parking brake at the second duty ratio. In a case where the deceleration is equal to or greater than the lower limit of the deceleration change (Gmin), less than the upper limit of the deceleration change (Gmax), and the wheel slip rate does not exceed a certain value, the process 120 may adjust a maximum value of the duty ratio when the deceleration change is a lower limit (Gmin), and the process 120 may adjust the first duty ratio of the parking brake application based on at least one of a minimum duty ratio, the lower limit of the deceleration change (Gmin), the upper limit of the deceleration change (Gmax), and the deceleration when the deceleration change is an upper limit (Gmax). In this case, the processor 120 may calculate a first duty ratio F corresponding to a corresponding a deceleration using Equation 2.

$$F = (Df\max - Df\min)/(G\min - G\max) * \text{Deceleration} + B. \quad \text{[Equation 2]}$$

Herein, F may be the first duty ratio corresponding to the deceleration, Gmin may be the lower limit of the deceleration change, Gmax may be the upper limit of the deceleration change, Dfmin may be a minimum value of the duty ratio when Gmax, Dfmax may be a maximum value of the duty ratio when Gmin, and B may be a constant. B may calculate using Equation 3 below.

$$B = Df\max - [(Df\max - Df\min)/(G\min - G\max) * G\min] \quad \text{[Equation 3]}$$

When the deceleration measured by the deceleration sensor 114 is within the deceleration change section, the processor 120 may control a release of the parking brake in the deceleration section to speed up and slow the parking brake application.

In addition, in a case where the deceleration measured by the deceleration sensor 114 is less than the lower limit of the deceleration change (Gmin), the processor 120 may apply the parking brake faster (higher) than the first duty ratio in the deceleration change section, or release the second duty ratio faster (higher) than the first duty ratio in the deceleration change section. Specifically, in a case where the deceleration is less than the lower limit of the deceleration change (Gmin) and the wheel slip rate exceeds a predetermined value, the processor 120 may release the parking brake at the second duty ratio. If the deceleration is less than the lower limit of the deceleration change (Gmin) and the wheel slip rate does not exceed a certain value, the processor 120 may apply the parking brake at the second duty ratio.

In addition, in a case where the deceleration measured by the deceleration sensor 114 is equal to or greater than the upper limit of the deceleration change (Gmax), the processor 120 may apply the parking brake to a third duty ratio corresponding to a minimum value of duty ratio or release the parking brake to the second duty ratio when the deceleration change is the upper limit (Gmax) according to the wheel slip rate. Specifically, in a case where the deceleration is equal to or greater than the upper limit of the deceleration change (Gmax) and the wheel slip rate exceeds a predetermined value, the processor 120 may release the parking brake with the second duty ratio. If the deceleration is equal to or greater than the upper limit of the deceleration change (Gmax) and the wheel slip rate does not exceed a certain value, the processor 120 may apply the parking brake with the third duty ratio corresponding to the minimum value of the duty ratio when the deceleration change is the upper limit (Gmax).

Meanwhile, an apparatus for controlling electronic brake 100 according to the present disclosure may further include a memory (not illustrated) for storing data related to an operation of the apparatus for controlling electronic brake 100. Herein, the memory may use a known storage medium, and for example, one or more of the known storage media such as a read only memory (ROM), a programmable read only memory (PROM), an erasable programmable read only memory (EPROM), an electrical erasable programmable read only memory (EEPROM), a random access memory (RAM), and the like may be used. In particular, a program (application or applet) for adjusting the duty ratio for brake application may be stored in the memory according to the deceleration and the wheel slip rate, and stored information may be selected by the processor 120 as necessary.

FIG. 2 is a flowchart illustrating an operation of the apparatus for controlling electronic brake of a vehicle according to an embodiment of the present disclosure.

Referring to FIG. 2, the processor 120 receives the deceleration and wheel speed from the sensor 110 (S202).

When step S202 is performed, the processor 120 determines whether the deceleration is equal to or greater than the lower limit of deceleration change (Gmin) and less than the upper limit of the deceleration change (Gmax) (S204). That is, the processor 120 may determine whether the deceleration is within the deceleration change section.

As a result of determining step S204, when the deceleration is equal to or greater than the lower limit of the deceleration change (Gmin) and less than the upper limit of the deceleration change (Gmax) (that is, within the deceleration change section), the processor 120 determines whether the wheel slip rate exceeds a preset constant value (S206).

As a result of determining step S206, when the wheel slip rate exceeds a predetermined value, the processor 120 releases the parking brake at the second duty ratio (S208).

As the result of determining step S206, in a case where the wheel slip rate does not exceed a certain value, the process 120 calculates a maximum value of duty ratio when the deceleration change is the lower limit (Gmin), and the process 120 calculates the first duty ratio of the parking brake application based on at least one of the minimum value of duty ratio, the lower limit of the deceleration change (Gmin), the upper limit of the deceleration change (Gmax), and the deceleration when the deceleration change is the upper limit (Gmax) (S210), and then applies a frequency brake with the first duty ratio (S212). Herein, the first duty ratio may be a value smaller than the second duty ratio.

When the deceleration is within the deceleration change section, the processor 120 may quickly release the parking brake in the deceleration section and control the parking brake application to be slow.

As the result of determining step S204, if the deceleration rate is equal to or greater than the lower limit of the deceleration change (Gmin) and less than the upper limit of the deceleration change (Gmax), the processor 120 determines whether the deceleration is less than the lower limit of the deceleration change (S214).

As a result of determining step S214, when the deceleration is less than the lower limit of the deceleration change (Gmin), the processor 120 determines whether the wheel slip rate exceeds a predetermined value (S216).

As a result of determining step S216, when the wheel slip rate exceeds a predetermined value, the processor 120 releases the parking brake at the second duty ratio (S218).

As the result of determining step S216, when the wheel slip rate does not exceed a predetermined value, the processor 120 applies the parking brake to the second duty ratio (S220).

As the result of determining step S214, if the deceleration is not less than the lower limit of the deceleration change (Gmin) but more than the upper limit of the deceleration change (Gmax), the processor 120 determines whether the wheel slip rate exceeds a certain value (S224).

As a result of determining step S224, when the wheel slip rate exceeds a predetermined value, the processor 120 releases the parking brake at the second duty ratio (S226).

If the wheel slip rate does not exceed a certain value, the processor 120 applies the parking brake at a third duty ratio corresponding to the minimum value of the duty ratio when the deceleration change becomes the upper limit (Gmax).

As described above, the apparatus and method for controlling electronic brake of a vehicle according to an aspect of the present disclosure may slow down a parking brake application by adjusting a duty ratio of a parking brake within a deceleration change section based on a wheel slip rate and a deceleration, thereby stably capable of controlling a brake while preventing the wheel from being applied during emergency braking.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling an electronic brake of a vehicle, the apparatus comprising:
   a sensor configured to detect a deceleration corresponding to a wheel speed or a brake force of a front wheel and a rear wheel of the vehicle; and
   a processor which is configured to slow down a parking brake application by determining a wheel slip rate based on the wheel speed of the front wheel and the wheel speed of the rear wheel, and by adjusting a first duty ratio of the parking brake application within a deceleration change section based on the determined wheel slip rate and the detected deceleration,
   wherein the processor is further configured to release a parking brake to a second duty ratio faster than the first duty ratio, in a case where the deceleration is equal to or greater than a lower limit of a deceleration change, less than an upper limit of the deceleration change, and the wheel slip rate exceeds a predetermined value.

2. The apparatus of claim 1, wherein the sensor comprises:
   a wheel speed sensor which is configured to detect the wheel speed of the front wheel and the wheel speed of the rear wheel; and
   a deceleration sensor which is configured to measure the deceleration.

3. The apparatus of claim 1,
   wherein the processor is further configured to determine the wheel slip rate based on a difference between the wheel speed of the front wheel and the wheel speed of the rear wheel.

4. The apparatus of claim 1,
   wherein in a case where the deceleration is equal to or greater than the lower limit of the deceleration change, less than the upper limit of the deceleration change, and the wheel slip rate does not exceed the predetermined value, the processor is further configured to adjust a maximum value of a duty ratio when the deceleration change is the lower limit and adjust the first duty ratio based on at least one of a minimum value of the duty ratio, the lower limit of the deceleration change, the upper limit of the deceleration change, and the deceleration when the deceleration change is the upper limit.

5. The apparatus of claim 1,
   wherein the processor is further configured to apply the parking brake to the second duty ratio, in a case where the deceleration is less than the lower limit of the deceleration change and the wheel slip rate does not exceed the predetermined value.

6. The apparatus of claim 5,
   wherein the processor is further configured to release the parking brake to the second duty ratio, in a case where the deceleration is less than the lower limit of the deceleration change and the wheel slip rate exceeds the predetermined value.

7. The apparatus of claim 1,
   wherein in a case where the deceleration is equal to or greater than the upper limit of the deceleration change and the wheel slip rate does not exceed the predetermined value, the processor is further configured to apply the parking brake with a third duty ratio corresponding to a minimum value of a duty ratio when the deceleration change is the upper limit.

8. The apparatus of claim 1,
   wherein the processor is further configured to release the parking brake to the second duty ratio, in a case where the deceleration is equal to or greater than the upper limit of the deceleration change and the wheel slip rate exceeds the predetermined value.

9. A method for controlling an electronic brake of a vehicle, the method comprising:
- receiving, by a processor, a deceleration corresponding to a wheel speed of a front wheel and a rear wheel of the vehicle or a brake pedal force,
- determining, by the processor, a wheel slip rate based on the wheel speed of the front wheel and the wheel speed of the rear wheel; and
- slowing down, by the processor, a parking brake application by adjusting a first duty ratio of the parking brake application within a deceleration change section based on the determined wheel slip rate and the received deceleration,
- wherein in the slowing down the parking brake application, the processor is configured to release a parking brake to a second duty ratio faster than the first duty ratio, in a case where the deceleration is equal to or greater than a lower limit of a deceleration change, less than an upper limit of the deceleration change, and the wheel slip rate exceeds a predetermined value.

10. The method of claim 9,
wherein in the determining the wheel slip rate, the processor is configured to determine the wheel slip rate based on a difference between the wheel speed of the front wheel and the wheel speed of the rear wheel.

11. The method of claim 9,
wherein in the slowing down the parking brake application, in a case where the deceleration is equal to or greater than the lower limit of the deceleration change, less than the upper limit of the deceleration change, and the wheel slip rate does not exceed the predetermined value, the processor is configured to adjust a maximum value of a duty ratio when the deceleration change is the lower limit and adjust the first duty ratio based on at least one of a minimum value of the duty ratio, the lower limit of the deceleration change, the upper limit of the deceleration change, and the deceleration when the deceleration change is the upper limit.

12. The method of claim 9,
wherein in the slowing down the parking brake application, the processor is configured to apply a parking brake to a second duty ratio, in a case where the deceleration is less than the lower limit of the deceleration change and the wheel slip rate does not exceed the predetermined value.

13. The method of claim 12,
wherein in the slowing down the parking brake application, the processor is configured to release the parking brake to the second duty ratio, in a case where the deceleration is less than the lower limit of the deceleration change and the wheel slip rate exceeds the predetermined value.

14. The method of claim 9,
wherein in the slowing down the parking brake application, in a case where the deceleration is equal to or greater than the upper limit of the deceleration change and the wheel slip rate does not exceed the predetermined value, the processor is configured to apply a parking brake with a third duty ratio corresponding to a minimum duty ratio when the deceleration is the upper limit.

15. The method of claim 14,
wherein in the slowing down the parking brake application, the processor is configured to release the parking brake to a second duty ratio, in a case where the deceleration is equal to or greater than the upper limit of the deceleration change and the wheel slip rate exceeds the predetermined value.

* * * * *